United States Patent [19]

Malmquist

[11] Patent Number: 4,921,712

[45] Date of Patent: May 1, 1990

[54] AUTOMATIC LOW VOLUME BEVERAGE BREWING SYSTEM

[76] Inventor: Neil A. Malmquist, 14 Kinsman La., Topsfield, Mass. 01983

[21] Appl. No.: 234,202

[22] Filed: Aug. 19, 1988

[51] Int. Cl.$^5$ .................. B65B 29/02; B65D 85/00; A47G 19/16

[52] U.S. Cl. .................... 426/77; 426/112; 426/83; 426/110; 99/295; 99/306

[58] Field of Search ................... 426/77–84, 426/112, 110, 433; 99/295, 306; 210/484, 282, 478, 479

[56] References Cited

U.S. PATENT DOCUMENTS

| | | | |
|---|---|---|---|
| 1,377,316 | 5/1921 | Clermont | 99/295 |
| 1,412,388 | 4/1922 | Clermont | 426/115 |
| 2,000,309 | 5/1935 | Wentorf | 99/306 |
| 2,047,134 | 7/1936 | Coleman | 99/306 |
| 2,137,243 | 11/1938 | Heyman | 426/77 |
| 2,292,101 | 8/1942 | Brown | 426/77 |
| 2,359,936 | 10/1944 | Peterson | 99/306 |
| 2,743,664 | 5/1956 | Dale . | |
| 2,822,273 | 2/1958 | Anderson | 99/295 |
| 2,899,310 | 8/1959 | Dale . | |
| 3,083,100 | 3/1963 | Baron | 426/77 |
| 3,083,101 | 3/1963 | Noury | 426/77 |
| 3,139,344 | 6/1964 | Weisman | 99/306 |
| 3,199,682 | 8/1965 | Scholtz . | |
| 3,309,980 | 3/1967 | Borek | 99/295 |
| 3,389,650 | 6/1968 | Michielsen | 426/433 |
| 3,445,237 | 5/1969 | Gidge | 426/77 |
| 3,610,461 | 10/1971 | Allyn | 426/113 |
| 3,811,373 | 5/1974 | Telco . | |
| 3,822,013 | 7/1974 | Van Der Veken . | |
| 3,823,656 | 7/1974 | Vanderveken | 99/306 |
| 3,878,772 | 4/1975 | Nordskog | 99/295 |
| 3,983,797 | 10/1976 | Wurm | 99/306 |
| 3,985,069 | 10/1976 | Cavalluzzi . | |
| 4,027,582 | 6/1977 | O'Connell | 99/306 |
| 4,069,751 | 1/1978 | Gronwick | 99/306 |
| 4,070,955 | 1/1978 | Braun | 99/306 |
| 4,136,202 | 1/1979 | Favre | 426/115 |
| 4,167,136 | 9/1979 | Chupuroy | 99/306 |
| 4,303,525 | 12/1981 | Stuver | 99/306 |
| 4,389,925 | 6/1983 | Piana | 99/295 |
| 4,471,689 | 9/1984 | Piana . | |
| 4,550,024 | 10/1985 | Legranse | 426/77 |
| 4,577,080 | 3/1986 | Grossman | 99/306 |
| 4,697,503 | 10/1987 | Okabe et al. | 426/82 |

FOREIGN PATENT DOCUMENTS

| | | | |
|---|---|---|---|
| 1347892 | 11/1962 | France | 99/306 |
| 2556323 | 6/1985 | France | 426/77 |
| 899055 | 6/1962 | United Kingdom | 426/433 |

*Primary Examiner*—Steven Weinstein
*Attorney, Agent, or Firm*—Hale and Dorr

[57] ABSTRACT

The invention is a system including a disposable cartridge for use with a drip type beverage brewing machine. The cartridge comprises a first cup, which has an open first end and a substantially closed second end, the second end being penetrated by at least one port. A filter member shaped substantially congruent with the first cup and coextensive with the first cup, has an open end coincident with the open end of the first cup and a closed end spaced away from the closed end of the first cup. A closure member has an open end and a substantially closed end, is concentric with and secured to and encloses the first cup. The closed end closes the open end of the first cup, and the closed end of the closure member is penetrated by a plurality of holes. A shallow receptacle adjoins the closed end of the closure member and is in fluid communication with the penetrating holes.

16 Claims, 3 Drawing Sheets

AUTOMATIC LOW VOLUME BEVERAGE BREWING SYSTEM

This invention relates generally to brewing beverages and relates more specifically to brewing small volumes of hot beverages, such as coffee.

BACKGROUND OF THE INVENTION

Many known beverages are prepared by brewing; i.e., by bringing a flavor element in contact with hot water for a predetermined period of time and then separating the hot, thus flavored water from the flavoring element. Coffee and tea are the most well-known such beverages in the U.S. Instant beverages are also known where the flavor element dissolves, in whole or in part, and flavors the hot water.

With respect to coffee, many known prior art systems exist. These include percolators and systems using sheets of filter paper supported by a conical or other suitably shaped structure resting above a collection vessel which receive water that has percolated or drained through the coffee grounds. The water may be delivered to the grounds either manually (i.e., pouring from a kettle) or automatically dripping from an automatic drip machine.

The known methods have drawbacks, particularly when used to brew a single cup or mug (i.e. 6-12 oz). They are labor intensive. One must: measure coffee into a filter; place the filter into a filter cone or pan; clean the pan after brewing to remove oils and other residue that fouls the taste of coffee brewed subsequent using the cone. In the case of a manual system, water must also be boiled and poured in periodically. If the coffee maker desires to pour the water into the coffee ground-retaining vessel only once, a large holding volume above the coffee grounds must be provided, as it takes some time for the water to drain through the coffee grounds and out into the vessel. Thus conical vessels are used to accommodate the large volume of water necessary to brew a full serving. When only a single cup is desired, the high amount of labor required with respect to the foregoing methods is undesirable and often discourages making the coffee. Further, if bulk ground coffee is used, the remaining coffee must be stored and as is well known, once ground coffee has been unsealed, it rapidly loses its flavor.

As an alternative, one desiring a single cup of coffee might brew a full pot, but this has the drawback that coffee that sits around for some time, becomes stale, or overheated and is often discarded, thereby engendering waste.

As a further, less labor intensive alternative, instant coffees are known, where the flavor element completely dissolves in the hot water. A drawback of this type of beverage system is that the taste of the beverage is notoriously poor.

Disposable coffee cartridges are known, but each have their drawbacks. U.S. Pat. No. 3,985,069, issued Oct. 12, 1976 to Cavalluzzi, discloses a conical coffee cartridge which fits in the bottom of a conical styrofoam filter pan. The cartridge consists of a conical filter paper cup. A cap covers the charge and an adhesively-attached plastic sheet maintains freshness. Cavalluzzi's device is designed to be used with manual introduction of water to the cup, as is evidenced by the conical cartridge and support structure. The conical structure is necessary to retain the large amount of water that would be deposited during the user's one-time introduction of water. The conical shape results in a rather large cartridge, both from side to side and top to bottom. Were this cartridge to be used with an automatic drip machine, it would require a relatively large chamber to accommodate the cone and thus a relatively large machine, inappropriate for a one cup brewing system.

U.S. Pat. Nos. 2,743,664 and 2,899,310, both issued to Dale and incorporating the same disclosure, disclose a type of disposable coffee brewer. Dale discloses a paper cup having a filter member at the bottom with a coffee charge fabricated into the bottom of the cup. The bottom of the cup is reinforced for support, as the paper cup rests on top of the cup in which the coffee will be served. A relatively tall receptacle (almost equal in height to the serving cup) is provided above the coffee brewing charge for retaining the water as the water drains through the coffee filter.

U.S. Pat. No. 3,823,656, issued to Vander Veken discloses a single use, throw-away coffee filter comprising a water-receiving receptacle having a cartridge, which rests in the bottom and includes the flavoring charge, and a filter. Vander Veken also contemplates manual filling of the receptacle incorporating a large receptacle for receiving the water.

Thus, the several objects of the invention are: to provide a single service system for brewing hot beverages, including coffee: that is small and compact in size; that requires little labor; that does not require cleaning of any parts; that incorporates a disposable, safe means for retaining the coffee grounds; that delivers coffee at a desirable rate; that is commercially feasible; that does not require the measurement of coffee and the insertion of a filter; and that does not result in unused bulk coffee exposed to deleterious effects of the air.

BRIEF DESCRIPTION OF A PREFERRED EMBODIMENT OF THE INVENTION

The system of the invention comprises in one preferred embodiment, an automatic drip coffee brewing machine and a disposable coffee-retaining cartridge. The cartridge is made from a suitable disposable material, such as coated paper or styrofoam. The cartridge comprises a first cup, having an open first end and a substantially closed second end, the second end being penetrated by at least one port, a filter member shaped substantially congruent with the first cup and coextensive with the first cup, having an open end coincident with the open end of the first cup and a closed end spaced away from the closed end of the first cup; and a closure member having an open end and a substantially closed end, concentric with and secured to and enclosing the first cup, the closed end closing the open end of the first cup, and the closed end of the closure member being penetrated by a plurality of holes. A very shallow receptacle for retaining water adjoins the closed end. The filter cup contains a charge of ground coffee beans.

A sealing sheet is provided at the top to prevent coffee grounds from leaking out through the holes. The coffee charge is hermetically sealed, preferably in nitrogen and sealed to maintain freshness. Alternatively, sealing sheets can be provided at both top and bottom to ensure that the coffee remains fresh during storage periods before use.

The coffee cartridge is used in conjunction with a brewing unit which consists of a holding tank for the water, a heating element to heat the water, a holder for the cartridge and a space for the vessel that will receive the coffee, such as a mug. The user turns on the unit, which delivers water at a predetermined rate, so that the water will not overflow the shallow receptacle formed by the upper rim of the upper cup. After the coffee has brewed, the cartridge is removed by means of a handle and thrown away. Nothing remains to clean up. No bulk coffee remains to be refrigerated and the unit is ready to brew another serving at any time. Because the receptacle adjoining the closure member is shallow, the cartridge, and thus the brewing unit, is rather small.

DETAILED DESCRIPTION OF A PREFERRED EMBODIMENT

Figures 1, 1A, 1B:
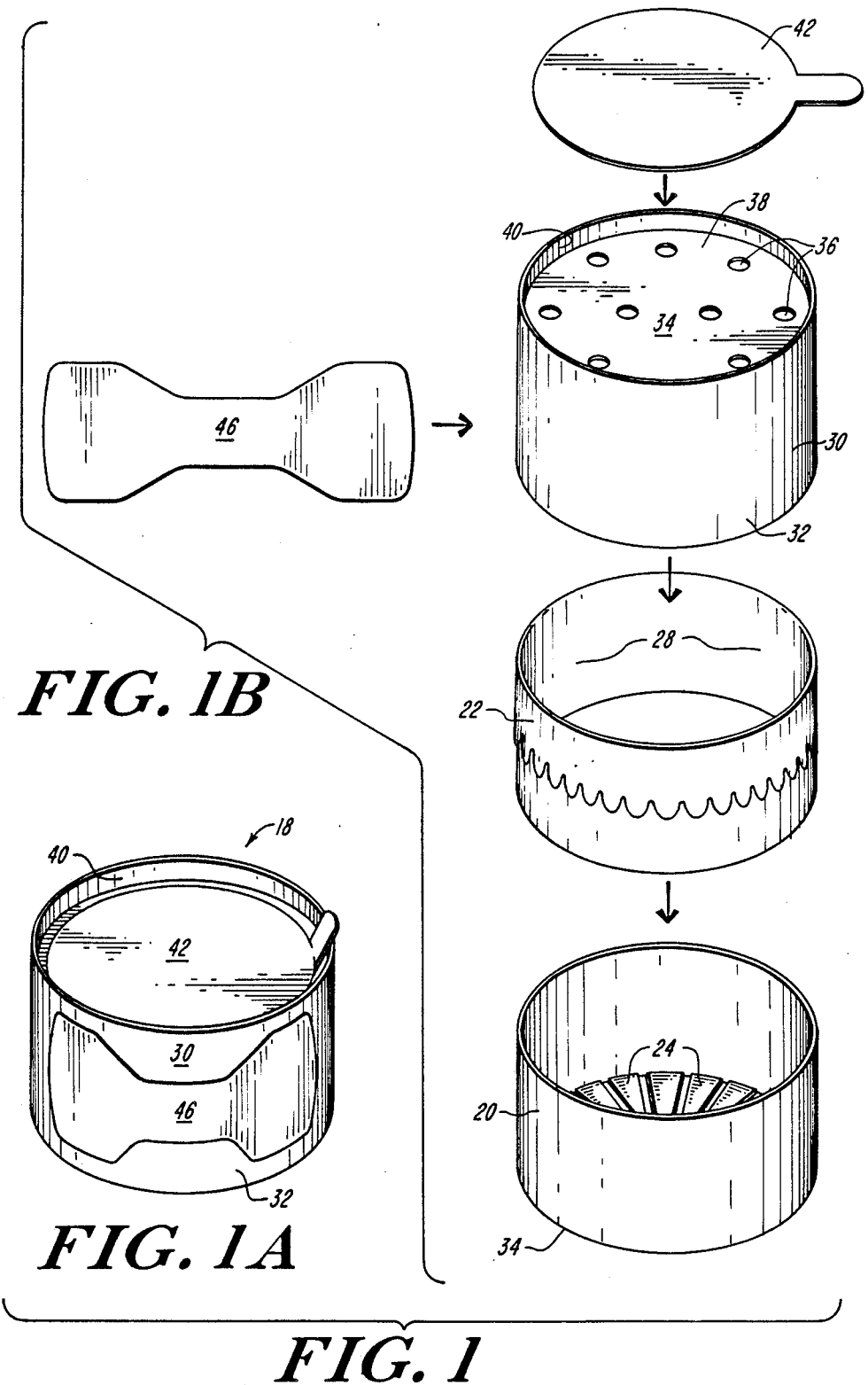
FIG. 1 (comprising FIG. 1a and FIG. 1b) shows a cartridge of the invention for use with coffee or a similar beverage in perspective (FIG. 1a) and in exploded perspective (FIG. 1b).

The manner in which the invention accomplishes the foregoing objects will best be understood with reference to the figures of the drawing and the following description. It will be understood that the invention is appropriate for brewing a wide variety of beverages, including coffee, tea, infusion and various malt and chicory beverages. To simplify discussion, however, but not to limit the invention's generality, the following description will refer only to coffee.

Figure 6:
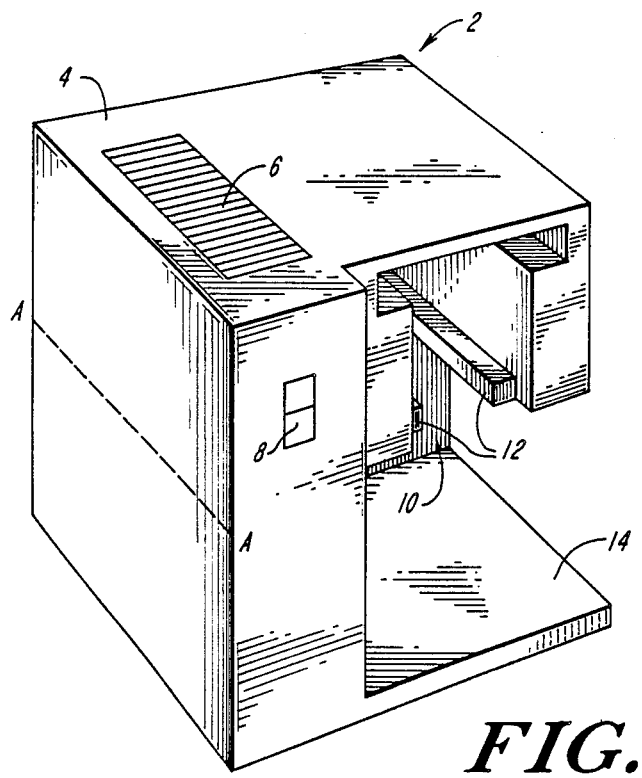
FIG. 6 shows a perspective view of a water heating and dispensing unit of a preferred embodiment of the invention.

Referring to FIG. 6, a unit 2 for heating and dispensing water through the coffee cartridge is shown. The unit consists of a tank 4 for holding water, which may be introduced into the tank through grill 6. The water is heated by a heating unit (not shown) activated by an off/on switch 8. A cartridge, containing the beverage to be brewed, for example, coffee, is received in cavity 10 and rests upon ledges 12. A cup or mug (not shown) is supported by platform 14 beneath the coffee-cartridge holding area.

Figure 7:
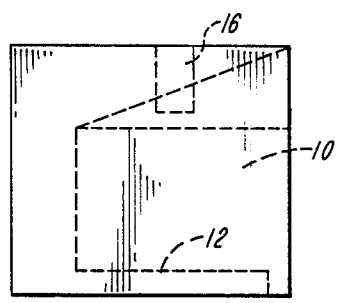
FIG. 7 shows a side elevation view of an upper portion of the brewing unit of FIG. 6, with some parts shown in phantom.

Referring now to FIG. 7, which shows an elevation view of the portion of the heating and dispensing unit above line A—A of FIG. 7, with certain structures shown in phantom, a water spout 16 is shown. Heated water from holding tank 4 is routed to water spout 16 from which it is dispensed into the chamber 10.

Figure 8:
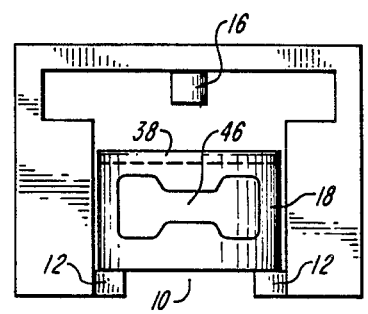
FIG. 8 shows a front elevation view of an upper portion of the unit of FIG. 6, with a beverage cartridge installed for use.

Referring now to FIG. 8, which shows the same section of the heating and dispensing unit 2 from a front view, with a beverage cartridge 18 in place, the placement of the beverage cartridge 18 within cavity 10 will be understood. The unit 2 can be equipped with a shut- off to prevent the heating element from being activated in the absence of water in the tank 4.

Referring to FIG. 1, the construction of a coffee cartridge 18 of a preferred embodiment of the invention is shown. FIG. 1a shows the coffee cartridge 18 assembled in perspective view. FIG. 1b shows an exploded view of the elements of a coffee cartridge 18. A lower cup 20 supports the entire structure. The lower cup 20 is dimensioned slightly smaller in diameter than the upper cup, so that the upper closure cup can slip over it.

As an illustration, an embodiment for making an 8 oz. serving of coffee will be reviewed. The embodiment should be taken as illustrative only. Other dimensions will be appropriate for embodiments to make different size servings. A bottom cup having a diameter of 2.125 inches (approximately 5.5 cm) and a height of 1.125 inches (approximately 2.8 cm) is suitable.

A filter element 22, which may be formed of filter paper, cloth mesh fabric or a non-woven fabric, is shaped to be congruent with the shape of the lower cup 20 and rests inside lower cup 20. Ribs 24 (shown also in FIG. 2) are placed in the bottom of lower cup 20. The ribs may be embossed on the bottom surface 26 of lower cup 20 (shown in phantom in FIG. 3), or may be formed as part of a preformed insert that inserts into the bottom of cup 20. The choice will depend upon manufacturing considerations. The ribs are approximately 0.0625 inches (approximately 0.16 cm) high and 0.0938 inches 0.28 cm) wide and are at least 0.625 in (1.6 cm) long.

Figure 3:
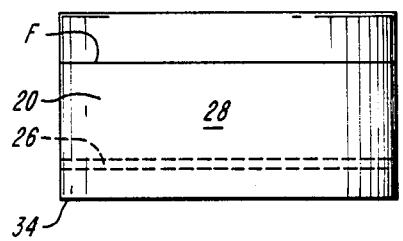
FIG. 3 shows an elevation view of the bottom cup of a cartridge of the invention.

A charge of coffee is placed inside filter element 22 in space 28. The relative volume of the space 28 and the amount of coffee must be such that sufficient space is allowed for the coffee to expand during brewing. This will depend upon the type of coffee used, however, a ratio of 3:2 (volume of cup:volume of coffee) will be suitable for most purposes. As shown in FIG. 3, a fill line F indicates the line to which coffee grounds are filled.

An upper closure cup 30 has an open-end 32 and a substantially closed end 34. Upper cup 30 envelopes the assembly of the filter 22 and lower cup 20 and the perimeter of the open end 32 is wrapped around the bottom of lower cup 20 at edge 34 to mechanically retain lower cup 34 within upper cup 30. The edge 32 is crimped around edge 34. Alternatively, it can be glued. It is also not necessary that the lower edge 32 wraps around edge 34 of the lower cup. It is only necessary that some method of securing upper cup 30 to lower cup 20 is utilized.

Figure 4:
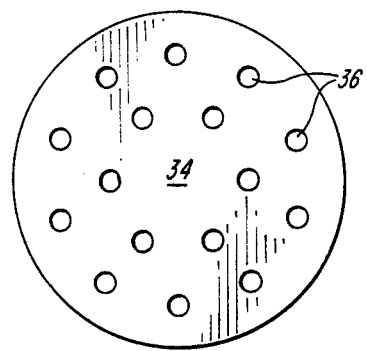
FIG. 4 shows a top plan view of the upper cup of a cartridge of the invention.
Figure 5:
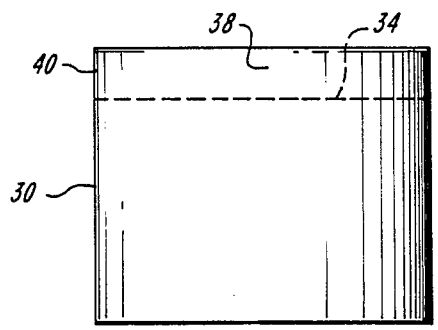
FIG. 5 shows an elevation view of the upper cup of a cartridge of the invention.

The substantially closed end 34 of upper cup 30 (seen also in FIG. 4) is pierced with holes 36, through which hot water will drip onto the coffee grounds retained in volume 28. The holes are approximately 0.094 in (0.24 cm) in diameter. A shallow retaining area 38 is formed above surface 34 by upper rim 40 of upper cup 30. This shallow retaining area is typically 0.3 in 0.79 cm) in height and must be sufficient to retain the amount of water that accumulates before the water drains through the coffee grounds. A sealing layer 42 is adhesively sealed to upper surface 34 to maintain the freshness of the coffee before use. A similar sealing sheet (not shown) can also seal off the bottom of the cartridge. Alternatively, the entire cartridge can be hermetically sealed.

Figure 2:
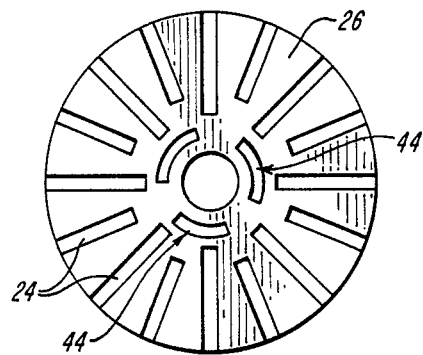
FIG. 2 shows a bottom plan view of the lower cup of a cartridge of the invention.

Referring to FIG. 2, ports 44 are provided in the bottom of lower cup 20 through which the brewed coffee flows from the cup 20 into the serving cup or mug (not shown) or other receptacle waiting to receive the water. Exit ports 44 are approximately 0.1875 in (0.47 cm) wide and 0.25 in (0.64 cm) long. Ribs 24 serve to keep the filter element 22 in a spaced relationship with respect to lower cup 20, to permit fluid and air flow.

Referring to FIG. 1, handle 46 is provided to facilitate removing the hot cartridge from the coffee unit for disposal.

It has been determined that using a low flow rate of about five ounces per minute, allows the space 38 established by rim 40 of upper cup 30 to be quite shallow. This reduces the bulk and vertical height of the coffee cartridge, making it more convenient and more appropriate for one cup use. It has also been determined that superior tasting coffee is obtained if the coffee charge is first wetted by hot water and allowed to sit for approximately one minute before adding additional water, rather than that a large volume of water be supplied at the outset and then permitted to drain. Thus, by using a low volume of water flow, superior tasting coffee is provided and a compact, convenient unit is facilitated.

The elements of the cartridge are made of plastic coated paper, capable of retaining liquid at temperatures above the boiling temperature of water. Alternatively, styrofoam plastic, or any other heat resistant, waterproof, disposable material suitable for retaining beverages may be used.

It will be understood that the foregoing described invention is suitable for use in many places where a single cup of coffee is often desired. Instances of such locations include hotel rooms, offices with only a few employees, boats and homes.

The foregoing description should be taken as illustrative and should not be considered to limit the invention in any sense.

Having described the invention, what is claimed is:

1. A disposable cartridge for use with a drip type beverage brewing machine comprising:
   a. a first cup having an open upper end, a side wall, and a substantially closed lower end, the lower end being penetrated by at least one port;
   b. a filter containing a charge of infusible beverage material and shaped substantially congruent with said first cup and coextensive with said first cup, said filter resting inside said first cup and having a closed end adjacent to and spaced away from said closed end of said first cup and an upper end above said closed end thereof;
   c. a closure member having an open lower end, a side wall, and a substantially closed upper end, said closure member being concentric with and secured to said first cup, said side wall of said closure member being in face-to-face engagement with the exterior of said side wall of said first cup, said closed upper end of said closure member closing said open upper end of said first cup, and said closed upper end of said closure member being penetrated by a plurality of holes; and
   d. a shallow receptacle defined at least in part by said closed upper end of said closure member, said receptacle being on the side of said closed upper end of said closure member opposite said beverage material and being arranged to be in fluid communication with said beverage material through said plurality of holes in said closed upper end of said closure member.

2. The beverage cartridge of claim 1 wherein the first cup is cylindrical, said closed end of said first cup defines a plurality of circumferentially-spaced, radially-extending ribs, and said filter rests on said ribs.

3. The beverage cartridge of claim 2 further wherein said first cup and said closure member are paper.

4. The beverage cartridge of claim 3 further wherein said filter member is paper.

5. The beverage cartridge of claim 4 further wherein said closure member comprises a second cup and said open end of said second cup is substantially coincident with said closed end of said first cup.

6. The beverage cartridge of claim 5 further wherein said open end of said second cup is folded over said closed end of said first cup and thus secures said first cup to said second cup.

7. The beverage cartridge of claim 6 further wherein said charge of beverage material is sufficient to flavor at most 12 oz. of water.

8. The beverage cartridge of claim 7 further wherein said beverage material comprises ground coffee beans.

9. A system for brewing beverages comprising:
   a. a unit for heating water comprising:
      i. means for retaining water;
      ii. means for heating said water;
      iii. means for retaining a beverage cartridge;
      iv. means for delivering said heated water to said beverage cartridge; and
      v. means for supporting a receptacle for said beverage; and
   b. the beverage cartridge of claim 1.

10. The beverage cartridge of claim 1 including a sealing element removably attached over said upper closed end of said closure member.

11. The disposable cartridge of claim 1 wherein said first cup includes a generally flat bottom wall penetrated by at least one port and a plurality of circumferentially-spaced, axially extending ribs projecting upwardly from the top of said bottom wall, and
   said filter is positioned on said ribs coextensive with and overlying said bottom wall of said first cup.

12. The cartridge of claim 11 wherein said bottom wall of said first cup has a plurality of arcuate ports of substantially the same inner radius therethrough, and wherein said ribs generally surrounds said ports.

13. The cartridge of claim 11 wherein said bottom wall of said first cup is spaced above the lower edge of said side wall of said first cup and defines said ribs.

14. The cartridge of claim 1 wherein the volume defined by said filter, said side wall of said first cup, and said closed upper end of said closure member is about 1½ times the volume of said beverage material.

15. The cartridge of claim 1 wherein said side wall of said closure member completely surrounds said side wall of said first cup.

16. The cartridge of claim 1 wherein said closed end of said closure member is a substantially flat wall that overlies and engages the top of said side wall of said first cup, and said side wall of said closure member extends above the top of said side wall of said first cup.

* * * * *